United States Patent
Grant-Acquah et al.

[11] Patent Number: 5,984,317
[45] Date of Patent: Nov. 16, 1999

[54] GALLING RESISTANT GASKET

[75] Inventors: Frank C. Grant-Acquah, Hanover Park; Kanu G. Shah, Arlington Heights; Thomas P. Plunkett, Lemont, all of Ill.

[73] Assignee: Dana Corporation, Toledo, Ohio

[21] Appl. No.: 08/827,850

[22] Filed: Apr. 11, 1997

[51] Int. Cl.$^6$ .................................................. F02F 11/00
[52] U.S. Cl. ........................................... 277/592; 277/601
[58] Field of Search .................................. 277/590, 591, 277/592, 600, 650, 627, 946, 936, 653, 601; 525/178, 180

[56] References Cited

U.S. PATENT DOCUMENTS

| | | | |
|---|---|---|---|
| 1,815,602 | 7/1931 | Russell | 277/601 |
| 4,042,747 | 8/1977 | Breton et al. | 428/323 |
| 4,434,989 | 3/1984 | Beyer et al. | 277/592 |
| 4,531,750 | 7/1985 | Herrington | 277/600 |
| 4,822,062 | 4/1989 | Gallo et al. | 277/592 |
| 4,839,221 | 6/1989 | Asaumi et al. | 442/376 |
| 4,990,544 | 2/1991 | Asaumi et al. | 521/145 |
| 5,368,648 | 11/1994 | Sekizuka | 277/653 X |
| 5,490,681 | 2/1996 | Plunkett et al. | 277/592 |
| 5,702,111 | 12/1997 | Smith | 277/650 |

OTHER PUBLICATIONS

Acheson Colloids Co. and Whitford Corp. Teflon coating advertisements, Thomas Register of American Manufacturers, 87th ed., vol. 20, p. TEF/37002, Apr. 1997.

Dupont, *Teflon Industrial Coatings,* Teflon–S Dry Lubricant–Black, 958–303, Jan. 1995, pp. 1–3.

Dupont, *Dupont Material Safety Data Sheet Fluoroproducts,* Feb. 24, 1995, pp. 1–6.

*Primary Examiner*—Lynne H. Browne
*Assistant Examiner*—Greg Binda
*Attorney, Agent, or Firm*—Rader, Fishman & Grauer PLLC

[57] ABSTRACT

A cylinder head gasket of the present invention includes a main gasket body and a metallic generally U-shaped flange which engages the inner periphery of a combustion bore opening formed in the main gasket body. A coating including tetrafluoroethylene and a high temperature resin binder such as either a polyimide or a polyamide-imide polymer are applied to at least the flange after it is formed and the entire gasket then cured at high temperatures in a series of steps including sintering to securely bond the coating to the flange. An optional plating layer disposed between the coating and the base material of the flange further improves bonding.

18 Claims, 1 Drawing Sheet

GALLING RESISTANT GASKET

FIELD OF THE INVENTION

The present invention relates generally to the fabrication of an engine cylinder head gasket. More particularly, the invention relates to a gasket with improved galling resistance to reduce the possibility of flange cracking.

BACKGROUND OF THE INVENTION

Gaskets are often used as a seal between mating mechanical components. One common application involves gasket placement between the engine block and cylinder head of an internal combustion engine. The engine block and cylinder head are bolted together and the gasket relies on the force of the bolted connection to seal the various openings between the two mating components. In particular, cylinder head gaskets typically extend around cylinder bores to provide a combustion seal, maintaining the high temperature gases of combustion within the cylinder bores. Simultaneously, the gaskets also seal fluid flow openings such as coolant and oil openings to prevent undesirable mixing.

It is typical for a cylinder head gasket to include a main gasket body with a cylinder bore opening, the periphery of which is surrounded by a metallic generally U-shaped flange. The flange engages both the upper face and the lower face of the main gasket body. The flange provides improved protection to the gasket body from the high temperature gases of combustion and serves to dissipate the heat of combustion into the gasket body and away from the cylinder bore opening.

In some applications the main gasket body is metallic. However, a metallic main gasket body has a limited thermal conductivity. Thus, it is known to use composite materials with improved thermal conductivity. However, many of these composite materials have a reduced ability to withstand the stresses and strains induced by the bolted connection of the mating components. Yet, the flange relies on the main gasket body for support. As a result, the flange is subjected to greater dynamic stresses induced through the use of a main gasket body formed from composite materials and may fail over time in a form of combustion seal fatigue failure commonly known as "flange cracking". A cracked flange, taken in isolation, does not necessarily result in a failed combustion seal. However, if the crack becomes large enough to allow the composite material of the main gasket body to extrude out, the likelihood for the loss of sealing stress and a blown cylinder head gasket greatly increases.

The phenomenon of flange cracking has been of particular concern with graphite based composite main gasket bodies. Graphite has been the optimum material for use in a variety of composite head gasket designs. It includes improved conformability, heat resistance and relaxation properties when compared to other asbestos replacement materials. Yet, it has a very low shear strength which allows for the thermally induced lateral motion of the cylinder head and engine block to drag the flange laterally back and forth. Further, graphite also includes a relatively low spring rate which can allow for greater dynamic lift-off deflections at the cylinder bore opening. Unfortunately, the low spring rate remains almost constant even after prolonged exposure to heat. Therefore, the dynamic stresses are unable to decrease over time.

Prior art methods for combating flange cracking have typically focused on the base material of the metallic flange. In particular, it is known that flange fatigue strength can be increased by changing the base material from a low carbon steel to a stainless steel. Despite the cost penalty associated with using a stainless steel flange, experience has demonstrated that flange cracking is not fully eliminated.

Low friction coatings, typically molybdenum and Teflon® based, applied to the flange surface have also been sporadically attempted in the past with limited success. The belief was that such coatings would help reduce shearing stresses. However, known coatings are applied to the base material of the flange before the flange is formed into its final shape. As a result, the coatings must be soft or formable enough to withstand the flange formation process. The use of formable coatings reduce long term fretting resistance and the coatings eventually break down. Thus, flange cracking is postponed, but not eliminated.

SUMMARY OF THE INVENTION

The present invention is directed to a gasket which includes a main gasket body with upper and lower faces, and a metallic generally U-shaped flange with an outer surface which engages the inner periphery of a combustion bore opening formed in the main gasket body. The flange includes opposing legs separated by a central section disposed within the fluid flow opening, an upper leg engaging the upper face of the main body and a lower leg engaging the lower face of the main gasket body.

A coating including a tetrafluoroethylene and a high temperature resin binder such as a polyimide or a polyamide-imide resin binder are applied about the outer surface of U-shaped flange after the flange has been formed and mated to the main gasket body and cured. Under some circumstances a polyamide resin binder may also be used. Preferably, the coating is from either the 958 Series of Teflon-S® or the 1000 Series of Xylan® resin-bonded lubricants. The resulting coating is extremely hard and non-formable.

The curing process includes flash drying the coating for between approximately two and five minutes at a metal temperature of between approximately 200 and 250° F. (93 and 121° C.). Following flash drying, the coating is sintered at a metal temperature range of between approximately 650 and 750° F. (343 and 399° C.) for five to fifteen minutes.

The coating significantly reduces the dynamic shearing stresses and the likelihood of flange fatigue cracking when compared even to flanges having formable molybdenum and Teflon® based coatings such as molybdenum disulfide. Because of the temperatures of curing, however, a graphite based main gasket body is preferred despite the very low shear strength and low spring rate which promote cracking in prior gasket designs. A plating layer primarily of nickel disposed between the outer surface of the flange and the coating is also preferred because it promotes bonding of the coating to the flange.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
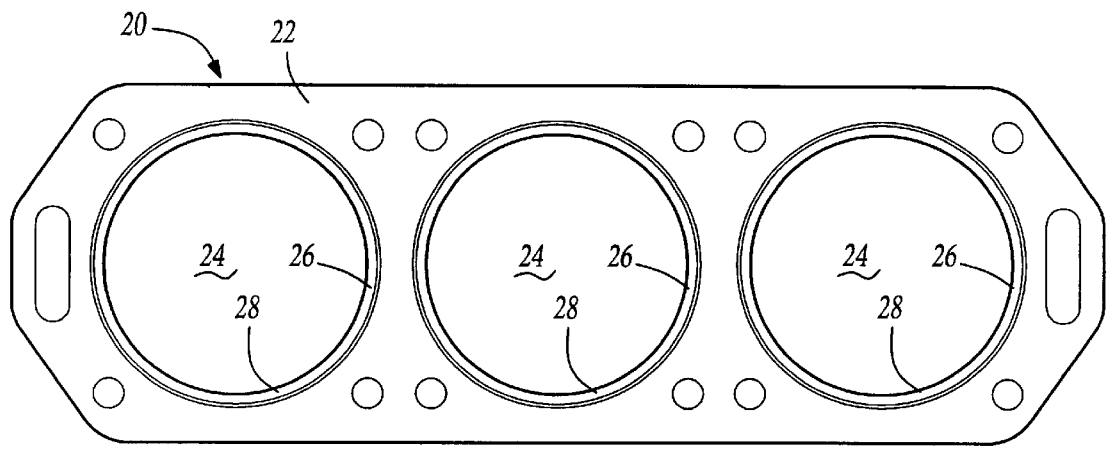
FIG. 1 is a planar view of a cylinder head gasket according to the present invention

As illustrated in FIG. 1, the present invention is directed to a cylinder head gasket 20 having a main body 22, and a plurality of fluid flow openings, the openings including combustion bore openings 24. A generally U-shaped flange 26 is received within an opening 24 and disposed about an inner periphery 28. Gasket 20 is used as a seal between an engine block and cylinder head of an internal combustion engine. The engine block and cylinder head are bolted together. Gasket 20 relies on the force of the bolted connection to seal the various openings between the two mating components.

Figure 2:
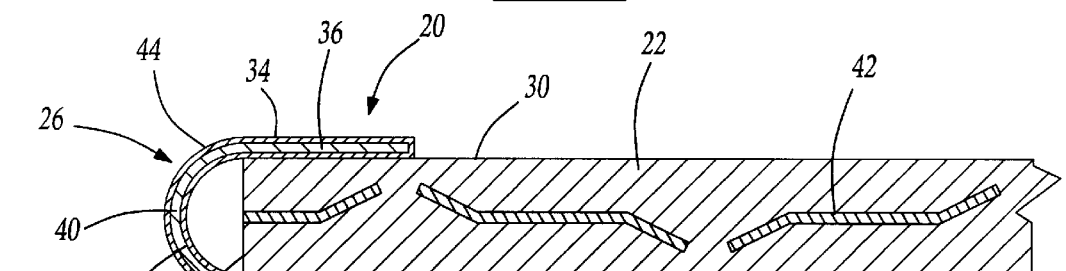
FIG. 2 is a partial cross-sectional view of the gasket showing an optional plating layer which was applied to the flange before it was formed into its operational shape.

The relationship between flange 26 and main body 22 is best illustrated in FIG. 2. Main body 22 includes an upper face 30 and a lower face 32. U-shaped flange 26 has an outer surface 34 and opposing legs 36, 38 separated by a central section 40. Leg 36 engages face 30 and leg 38 engages lower face 32. Central section 40 is generally arcuate and extends radially inwardly into opening 24 away from periphery 28. Flange 26 provides improved protection to main body 22 from the high temperature gases of combustion and serves to dissipate the heat of combustion into main body 22 and away from cylinder bore opening 24.

Preferably, main body 22 is formed as a composite having improved thermal conductivity when compared to a solely metallic component. A plurality of optional metallic tangs 42 are disposed within the main body 22. In a most preferred embodiment, as discussed further below, main body 22 is formed from graphite.

Figure 3:
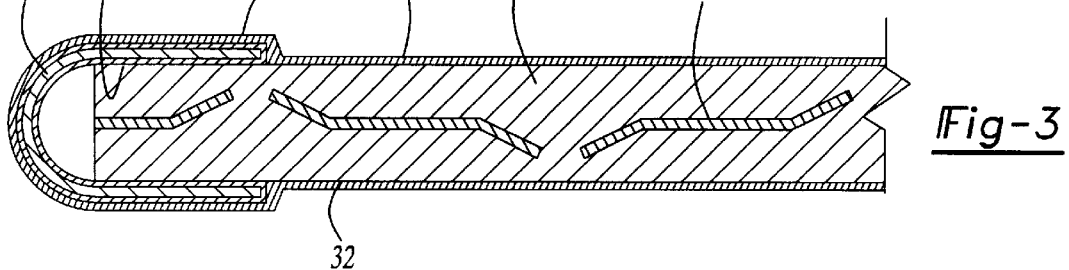
FIG. 3 is a partial cross-sectional view of the gasket along lines 3—3 in FIG. 1 showing the gasket after the final coating has been applied to the flange and to at least a portion of the main gasket body.

In FIG. 2, outer surface 40 of flange 26 includes an optional plating layer 44. A preferred plating layer 44 is predominantly nickel, particularly when main body 22 is formed from graphite. Layer 44 protects the inside of flange 26 from corrosive elements found in graphite such as chlorine and sulfur. As shown in FIG. 3, gasket 20 includes an outer coating 46 disposed about outer surface 40 and in optional engaging contact with main body faces 30 and 32. Coating 46 includes tetrafluoroethylene and a high temperature resin binder. Preferred binders includes either a polyimide or a polyamide-imide polymer. Under certain circumstances a polyamide polymer binder may be used. A most preferred coating 46 is formed from either the 958 Series of Teflon-S® or the 1000 Series of Xylan® resin-bonded lubricants.

Figure 4:
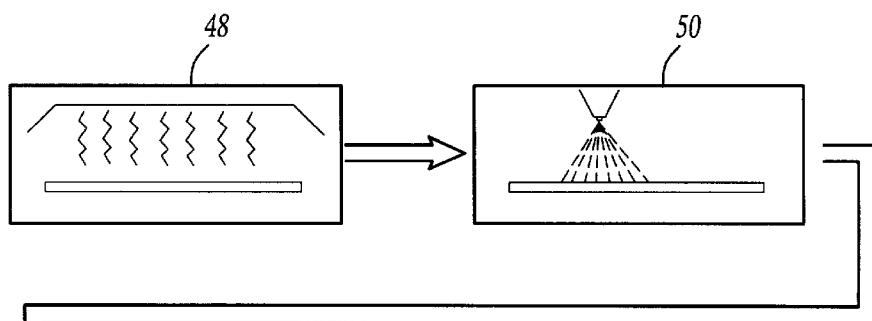
FIG. 4 illustrates the process for applying the coating illustrated in FIG. 3.
Figure 4:
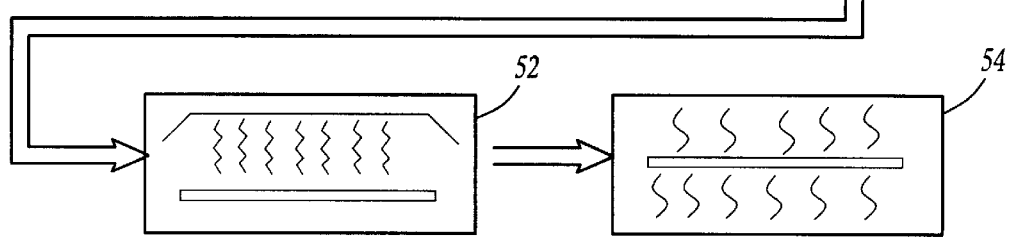

Coating 46 is formed as shown in FIG. 4. First, gasket 20 is predried as shown at point 48 for between approximately two and five minutes at a metal temperature of between approximately 650 and 700° F. (343 and 371° C.). Typically, the higher the temperature, the less time required. Next, coating 46 is applied to outer surface 34 of flange 26 as shown at point 50, including at least outer surface 34 of flange 26, by means of roll coating, curtain coating, screen printing or spraying. Preferably, coating 46 has a dry film thickness of between 0.0005 and 0.0015 inches. Then gasket 20 is cured. The curing process includes optionally flash drying the coating as shown at point 52 for between approximately two and five minutes at a metal temperature of between approximately 200 and 250° F. (93 and 121° C.). Then at point 54 coating 46 is sintered at a metal temperature of between 650 and 750° F. (343 and 399° C.) for a time of between five and fifteen minutes. Typically, the higher the temperature, the less sintering time that is required. Once cured, coating 46 is extremely hard and non-formable.

Coating 46 provides numerous unexpected benefits. It reduces the dynamic shearing stresses on flange 26 significantly. Flange 26 may be formed from low and even ultra low carbon steels as opposed to more expensive stainless steels. Not only are dynamic shearing stresses reduced, however. Testing shows that fatigue life improves by a factor of at least ten times with coating 46 as compared to uncoated flanges when subjected to cyclic stresses in the vertical direction only. Testing shows an improvement in fatigue life of at least eight times with coating 46 as compared to flanges having formable molybdenum and Teflon® based coatings such as molybdenum disulfide.

The prior art has taught away from applying a coating including a tetrafluoroethylene resin and a high temperature resin binder such as either a polyimide or a polyamide-imide polymer to a finished gasket because of the damage which typically results from treating the coating at the high temperatures discussed above. For example, sintering must take place at a minimum metal temperature of approximately 650° F. (343° C.) to provide the necessary chemical bond between the coating and the substrate of flange 26 or plating layer 44. Lower temperatures have not provided the required performance. Preferably, the metal temperature is approximately 750° F. (399° C.), which is substantially higher than the recommended maximum metal temperature of 650° F. (343° C.) for such coatings. However, testing suggests that it is undesirable to raise the temperature much beyond 750° F. (399° C.) without compromising the bonding characteristics of the binder in the coating.

Even at approximately 750° F. (399° C.) virtually all composite materials except a main body 22 formed from graphite are well beyond their temperature limit. Graphite has been found, however, to have such a significant heat resistance that it is completely unaffected by the high temperature of sintering. Thus, graphite is a preferred material for the present invention despite its very low shear strength and low spring rate which promote flange cracking in prior gasket designs. Further, the application of coating 46 directly to a graphite main body 22 as part of the coating process has not resulted in any deleterious side effects.

The art also teaches away from the inventive use of coating 46 because of the temperatures which the coating itself is subjected to in operation. The art teaches that a coating containing a tetrafluoroethylene resin and a high temperature resin binder can withstand a maximum use temperature of approximately 500° F. (260° C.). Supposedly, abrasion resistance is reduced at temperatures above 400° F. (205° C.). Yet, flange 26 is routinely subjected to combustion bore temperatures in excess of 800° F. (427° C.), significantly beyond the maximum use temperature, but still provides the unexpected results discussed above.

Finally, as noted above, plating layer 44 is optionally applied to provide corrosion resistance. However, it turns out that the application of plating layer 44 to outer surface 34 of flange 26, particularly when it is nickel, significantly aids the bonding of coating 46 to flange 26. The improved performance characteristics noted above include the use of nickel based plating layer 44.

The disclosed embodiments and examples are given to illustrate the present invention. However, they are not meant to limit the scope and spirit of the present invention. Therefore, the present invention should be limited only by the appended claims.

What is claimed is:

1. A cylinder head gasket comprising:
   a main gasket body having an upper face and a lower face, said main body including a fluid flow opening defined by a periphery of said main gasket body;
   a metallic generally U-shaped flange separate from said main gasket body, said U-shaped flange having an outer surface, said U-shaped flange having opposing legs separated by a central section disposed within said fluid flow opening, an upper leg engaging said upper face and a lower leg engaging said lower face with said central section extending radially into said opening away from said periphery;
   a non-formable coating about said outer surface of said U-shaped flange, said coating including tetrafluroethylene and a high temperature resin binder.

2. A gasket as recited in claim 1, wherein said high temperature resin binder of said coating is one of a polyamide, a polyimide and a polyamide-imide polymer.

3. A gasket as recited in claim 2, wherein application of said coating includes the steps of:
   applying said coating to said U-shaped flange;
   flash drying said coating after said applying step; and
   sintering said coating after said flash drying step at a minimum metal temperature of approximately 650° F. (343° C.) for a minimum time of approximately five minutes.

4. A gasket as recited in claim 3, wherein said sintering step has a maximum metal temperature of approximately 750° F. (399° C.) and a maximum time of approximately fifteen minutes.

5. A gasket as recited in claim 4, wherein said coating has a dry film thickness of between 0.0005 and 0.0015 inches.

6. A gasket as recited in claim 5, wherein said applying step comprises one of roll coating, curtain coating, screen printing and spraying.

7. A gasket as recited in claim 6, wherein said flash drying step is between approximately two and five minutes and between approximately 200 and 250° F. (121° C.).

8. A gasket as recited in claim 7, wherein said coating step includes a predrying step before said applying step, said predrying step at between approximately two and five minutes and between approximately 650 and 700° F. (343 and 371° C.).

9. A gasket as recited in claim 2, wherein a plating layer is disposed between said U-shaped flange and said coating.

10. A gasket as recited in claim 9, wherein said plating layer is applied to the base material of said U-shaped flange before said material is formed into said U-shaped flange.

11. A gasket as recited in claim 9, wherein said plating layer is predominantly nickel.

12. A gasket as recited in claim 2, wherein said coating is applied about said outer surface of said flange and directly to said main gasket body.

13. A cylinder head gasket comprising:
    a main gasket body formed predominantly from graphite having an upper face and a lower face, said main body including a fluid flow opening defined by a periphery of said main gasket body;
    a metallic generally U-shaped flange with an outer surface, said flange having opposing legs separated by a central section disposed within said fluid flow opening, an upper leg engaging said upper face and a lower leg engaging said lower face with said central section extending radially into said opening away from said periphery;
    a coating applied about said outer surface of said U-shaped flange after said flange engages said main gasket body such that said coating engages at least a portion of both said upper and lower faces of said main gasket body and has a dry film thickness of between 0.0005 and 0.0015 inches, said coating including a tetrafluoroethylene and one of a high temperature polyamide, polyimide and polyamide-imide resin binder, wherein said application of said coating includes the steps of
    applying said coating to said U-shaped flange by means of one of roll coating, curtain coating, screen printing and spraying,
    flash drying said coating after said applying step for approximately two and five minutes and with a metal temperature of between approximately 200 and 250° F. (121° C.), and
    sintering said coating after said flash drying step in a metal temperature range of between approximately 650 and 750° F. (343 and 399° C.) for a time of between approximately five and fifteen minutes.

14. A gasket as recited in claim 13, wherein a plating layer is disposed between said flange and said coating.

15. A gasket as recited in claim 14, wherein said plating layer comprises predominantly nickel and is applied to the base material of said flange before the base material is formed into said U-shaped flange.

16. A gasket formed by the process of:
    making a main gasket body predominantly from graphite having an upper face and a lower face, said main body including a fluid flow opening defined by a periphery of said main gasket body;
    forming a metallic material into a generally U-shaped flange with an outer surface, said flange having opposing legs separated by a central section disposed within said fluid flow opening, an upper leg engaging said upper face and a lower leg engaging said lower face with said central section extending radially into said opening away from said periphery;
    applying a coating about said outer surface of said U-shaped flange after said flange engages said main gasket body such that said coating has a dry film thickness of between 0.0005 and 0.0015 inches, said coating including a tetrafluoroethylene and one of a high temperature polyamide, polyimide and polyamide-imide resin binder;
    flash drying said coating after said applying step for between approximately two and five minutes at a metal temperature of between approximately 200 and 250° F. (93 and 121° C.); and
    sintering said coating after said flash drying step at a metal temperature range of between approximately 650 and 750° F. (343 and 399° C.) for a time of between approximately five and fifteen minutes.

17. A gasket formed by the process recited in claim 16, including plating said outer surface of the material of said flange before said forming step.

18. A gasket formed by the process recited in claim 17, wherein said plating comprises predominantly nickel.

* * * * *